United States Patent
Terashima et al.

(10) Patent No.: US 9,709,881 B2
(45) Date of Patent: *Jul. 18, 2017

(54) DISCHARGE LAMP LIGHTING DEVICE, DISCHARGE LAMP LIGHTING METHOD, AND PROJECTOR

(71) Applicant: SEIKO EPSON CORPORATION, Tokyo (JP)

(72) Inventors: Tetsuo Terashima, Azumino (JP); Osamu Saito, Matsumoto (JP); Takeshi Nakajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 14/511,722

(22) Filed: Oct. 10, 2014

(65) Prior Publication Data

US 2015/0192846 A1    Jul. 9, 2015

(30) Foreign Application Priority Data

Oct. 17, 2013 (JP) ................. 2013-216107

(51) Int. Cl.
| | |
|---|---|
| H05B 37/02 | (2006.01) |
| G03B 21/20 | (2006.01) |
| H05B 41/288 | (2006.01) |
| H05B 41/28 | (2006.01) |
| H05B 41/38 | (2006.01) |

(52) U.S. Cl.
CPC ......... *G03B 21/2053* (2013.01); *H05B 41/28* (2013.01); *H05B 41/2883* (2013.01); *H05B 41/386* (2013.01)

(58) Field of Classification Search
CPC ......... H05B 41/14; H05B 41/16; H05B 41/24
USPC .............. 315/224, 225, 226, 291, 283, 308; 353/85
See application file for complete search history.

(56) References Cited

U.S. PATENT DOCUMENTS

| | | |
|---|---|---|
| 5,925,990 A | 7/1999 | Crouse et al. |
| 6,304,039 B1 | 10/2001 | Appelberg et al. |

(Continued)

FOREIGN PATENT DOCUMENTS

| | | |
|---|---|---|
| EP | 1 467 601 A1 | 10/2004 |
| EP | 1 689 215 A1 | 8/2006 |

(Continued)

OTHER PUBLICATIONS

Mar. 30, 2015 Extended Search Report issued in European Patent Application No. 14189387.5.

*Primary Examiner* — Thuy Vinh Tran
(74) *Attorney, Agent, or Firm* — Oliff PLC

(57) ABSTRACT

A discharge lamp lighting device according to an aspect of the invention includes a resonance circuit unit connected to a discharge lamp, a power converting unit configured to convert direct-current power into alternating-current power and supply the alternating-current power to the discharge lamp via the resonance circuit unit, and a control unit configured to supply the alternating-current power having a first frequency for causing resonance of the resonance circuit unit and a second frequency different from the first frequency, to the discharge lamp in a lighting start period from a start of lighting of the discharge lamp to a steady lighting state of the discharge. The second frequency is equal to or higher than 100 kHz.

17 Claims, 9 Drawing Sheets

(56) References Cited

U.S. PATENT DOCUMENTS

| | | |
|---|---|---|
| 7,153,214 B2 | 12/2006 | Delaney et al. |
| 7,211,970 B2 * | 5/2007 | Takahashi ............ H05B 41/282 |
| | | 315/209 R |
| 7,230,388 B2 | 6/2007 | Takeuchi |
| 7,397,197 B2 * | 7/2008 | Ohta ................... H05B 41/2883 |
| | | 315/226 |
| 8,207,680 B2 | 6/2012 | Nakada et al. |
| 8,222,834 B2 * | 7/2012 | Nakada .............. H05B 41/2886 |
| | | 315/209 R |
| 8,294,385 B2 * | 10/2012 | Kumagai ........... H05B 41/2883 |
| | | 315/209 R |
| 8,319,447 B2 * | 11/2012 | Hasegawa .......... H05B 41/2887 |
| | | 315/224 |
| 8,400,074 B2 * | 3/2013 | Hasegawa .......... H05B 41/2988 |
| | | 315/209 R |
| 8,581,510 B2 * | 11/2013 | Nakada .............. H05B 41/2886 |
| | | 315/224 |
| 2004/0130273 A1 * | 7/2004 | Alexandrov ............ H02M 1/38 |
| | | 315/291 |
| 2004/0160152 A1 | 8/2004 | Onishi et al. |
| 2004/0257001 A1 | 12/2004 | Langeslag et al. |
| 2006/0055345 A1 | 3/2006 | Takeuchi |
| 2007/0103649 A1 | 5/2007 | Takada et al. |
| 2010/0195062 A1 * | 8/2010 | Ueda .................. G03B 21/2026 |
| | | 353/84 |
| 2011/0018460 A1 | 1/2011 | Samejima et al. |
| 2012/0319588 A1 | 12/2012 | Sid |
| 2013/0033684 A1 | 2/2013 | Saito |
| 2013/0207568 A1 | 8/2013 | Suzuki |
| 2013/0250254 A1 | 9/2013 | Saito et al. |

FOREIGN PATENT DOCUMENTS

| | | |
|---|---|---|
| JP | 2004-111298 A | 4/2004 |
| JP | 2004-221031 A | 8/2004 |
| JP | 2005-507554 A | 3/2005 |
| JP | A-2007-027145 | 2/2007 |
| JP | 2011-029011 A | 2/2011 |
| JP | A-2013-033600 | 2/2013 |
| JP | 2013-164966 A | 8/2013 |
| JP | A-2013-255474 | 10/2013 |
| WO | 03-039211 A1 | 5/2003 |

* cited by examiner

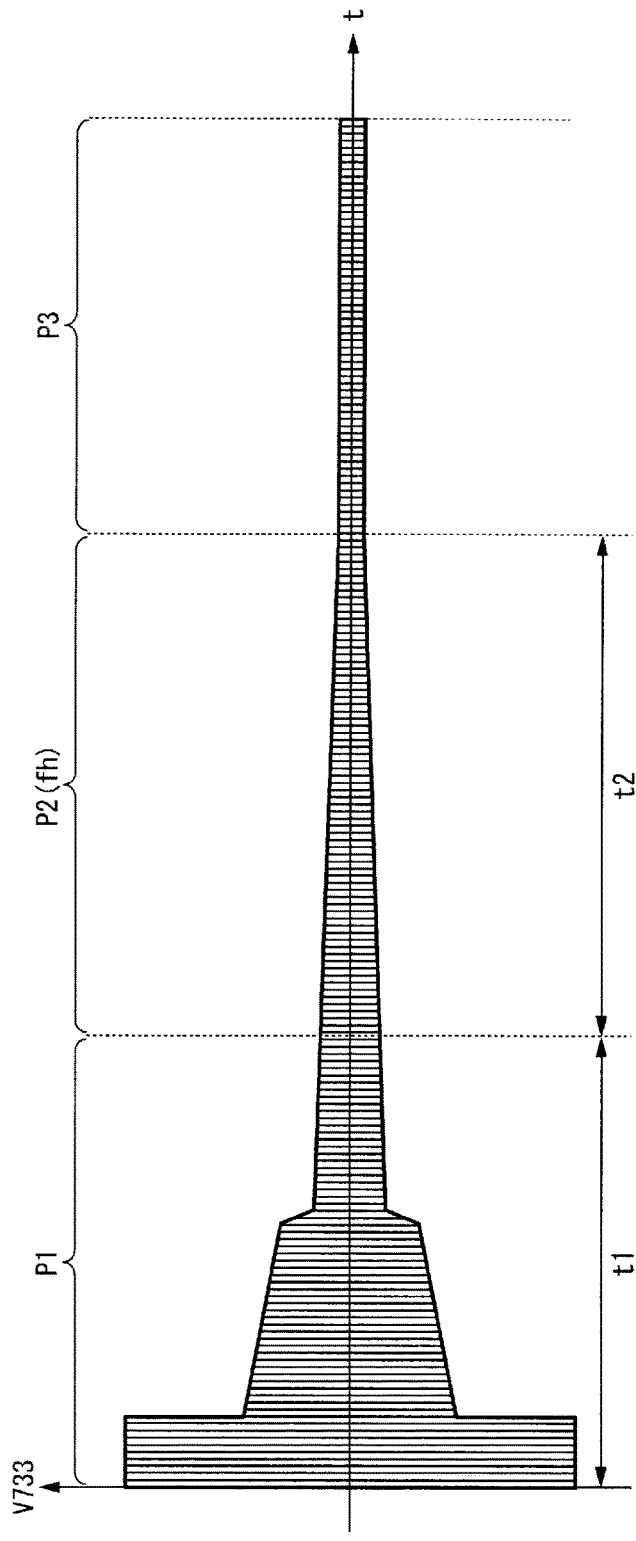
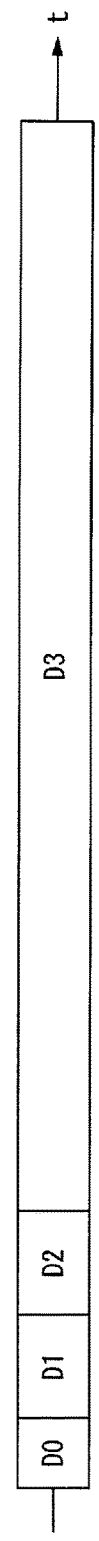
FIG. 3A
FIG. 3B

DISCHARGE LAMP LIGHTING DEVICE, DISCHARGE LAMP LIGHTING METHOD, AND PROJECTOR

BACKGROUND

1. Technical Field

The present invention relates to a discharge lamp lighting device, a discharge lamp lighting method, and a projector.

2. Related Art

A projector including a discharge lamp such as a high pressure mercury lamp as a light source is known. The projector of this type includes a resonance circuit in order to obtain a high voltage for starting electric discharge of the discharge lamp (see, for example, JP-A-2007-27145 (Patent Literature 1)). In such a projector, when the discharge lamp is lit, a high voltage can be obtained by adjusting a frequency of alternating-current power supplied to the discharge lamp to a resonance frequency of the resonance circuit. After the discharge lamp starts the electric discharge and is lit, the frequency of the alternating-current power supplied to the discharge lamp is reduced. Electric power during steady lighting is given to the discharge lamp.

Individual differences and aged deteriorations are present in an inductance component and a capacitance component of the resonance circuit. Therefore, if the frequency of the alternating-current power supplied to the resonance circuit is fixed when the discharge lamp is lit, it is likely that resonance does not occur and, as a result, the discharge lamp is not lit. In order to prevent such a problem, in the technique disclosed, in Patent Literature 1, every time the discharge lamp is lit, an actual resonance frequency is found by monotonously increasing the frequency of the alternating-current power supplied to the discharge lamp to the resonance frequency.

However, with the method of monotonously changing the frequency of the alternating-current power supplied to the discharge lamp, the resonance circuit is placed in a quasi-resonance state until the discharge lamp is lit. In such a state, a voltage and an electric current in the resonance circuit increase. A switching loss of a bridge circuit or the like that generates the alternating-current power supplied to the resonance circuit also increases. Therefore, power consumption in lighting the discharge lamp increases.

SUMMARY

An advantage of some aspects of the invention is to provide a discharge lamp lighting device, a discharge lamp lighting method, and a projector that can light a discharge lamp while suppressing power consumption.

An aspect of the invention is directed to a discharge lamp lighting device including: a resonance circuit unit connected to a discharge lamp; a power converting unit configured to convert direct-current power into alternating-current power and supply the alternating-current power to the discharge lamp via the resonance circuit unit; and a control unit configured to supply the alternating-current power having a first frequency for causing resonance of the resonance circuit unit and a second frequency different from the first frequency, to the discharge lamp in a lighting start period from a start of lighting of the discharge lamp to a steady lighting state of the discharge lamp. The second frequency is equal to or higher than 100 kHz.

With the discharge lamp lighting device according to the aspect, in lighting the discharge lamp, rather than continuously changing the frequency of the alternating-current power supplied to the resonance circuit unit, the discharge lamp lighting device supplies, to the discharge lamp, the alternating-current power having the first frequency for causing the resonance circuit unit to resonate and the second frequency equal to or higher than 100 kHz different from the first frequency. Therefore, the resonance circuit unit is not continuously placed in a quasi-resonance state or a resonance state. In a period corresponding to the second frequency, a reactance component of the resonance circuit unit temporarily becomes apparent. Therefore, according to the aspect of the invention, the voltage and the electric current in the resonance circuit unit are suppressed and the power consumption in the resonance circuit unit is suppressed.

Since the second frequency is set to the frequency equal to or higher than 100 kHz, it is possible to reduce a current value supplied to the discharge lamp. Consequently, it is possible to reduce energy of unstable arc discharge that occurs in the discharge lamp when the discharge lamp starts electric discharge, it is possible to reduce damage to the discharge lamp due to the unstable arc discharge.

The second frequency may be equal to or higher than 145 kHz.

The second frequency may be equal to or lower than 170 kHz.

The first frequency may be equal to or higher than 100 kHz.

With this configuration, it is possible to further reduce damage to the discharge lamp.

The first frequency may be a frequency lower than the second frequency.

It is possible to reduce the first frequency by setting the first frequency for causing the resonance of the resonance circuit to a triple resonance mode or an odd number times mode larger than the triple resonance mode. In such a case, the first frequency is easily set lower than the second frequency, the resonance circuit unit is reduced in size, and a switching loss of the power converting unit can be reduced.

With this configuration, for example, when the triple resonance mode is used, that is, when the resonance frequency of the resonance circuit unit is about 130 kHz, the first frequency is set lower than the second frequency, in other words, the second frequency is set higher than 130 kHz. Therefore, it is possible to expand a range in which the second frequency equal to or higher than 100 kHz is selected.

Another aspect of the invention is directed to a discharge lamp lighting device including: a resonance circuit unit connected to a discharge lamp; a power converting unit configured to convert direct-current power into alternating-current power and supply the alternating-current power to the discharge lamp via the resonance circuit unit; and a control unit configured to supply the alternating-current power having a first frequency and a second frequency different from the first frequency, to the discharge lamp in a lighting start period from a start of lighting of the discharge lamp to a steady lighting state of the discharge lamp. The control unit changes stepwise the first frequency to decrease from a frequency higher than a frequency for causing resonance of the resonance circuit unit toward the frequency for causing the resonance. The second frequency is equal to or higher than 100 kHz.

With the discharge lamp lighting device according to the aspect of the invention, the first frequency is changed stepwise to the frequency for causing the resonance. Therefore, it is easy to set the first frequency to the frequency for causing the resonance.

With the discharge lamp lighting device according to the aspect of the invention, in a process in which the first frequency is changed stepwise to the frequency for causing the resonance, the resonance circuit unit operates in a capacitive region. Therefore, an electric current flowing back from the resonance circuit unit to the power converting unit does not occur in a process in which the power converting unit carries out a switching operation. Therefore, it is possible to prevent a loss due to the backflow current.

Still another aspect of the invention is directed to a discharge lamp lighting method, including: converting, with a power converting unit, direct-current power into alternating-current power and supplying the alternating-current power to a discharge lamp via a resonance circuit unit; and supplying, with a control unit, the alternating-current power having a first frequency for causing resonance of the resonance circuit unit and a second frequency different from the first frequency, to the discharge lamp in a lighting start period from a start of lighting of the discharge lamp to a steady lighting state of the discharge. The second frequency is equal to or higher than 100 kHz.

With the discharge lamp lighting method according to the aspect of the invention, it is possible to obtain action and effects same as those of the discharge lamp lighting device according to the aspect explained above.

Yet another aspect of the invention is directed to a projector including the discharge lamp described above as a light source and including the discharge lamp lighting device as a device for lighting the discharge lamp.

With the projector according to the aspect of the invention, it is possible to obtain action and effects same as those of the discharge lamp lighting device according to the aspect explained above.

BRIEF DESCRIPTION OF THE DRAWINGS

The invention will be described with reference to the accompanying drawings, wherein like numbers reference like elements.

FIGS. 3A and 3B are diagrams for explaining an overview of a lighting operation of a discharge lamp in the projector in the embodiment.

DESCRIPTION OF EXEMPLARY EMBODIMENTS

Figure 1:
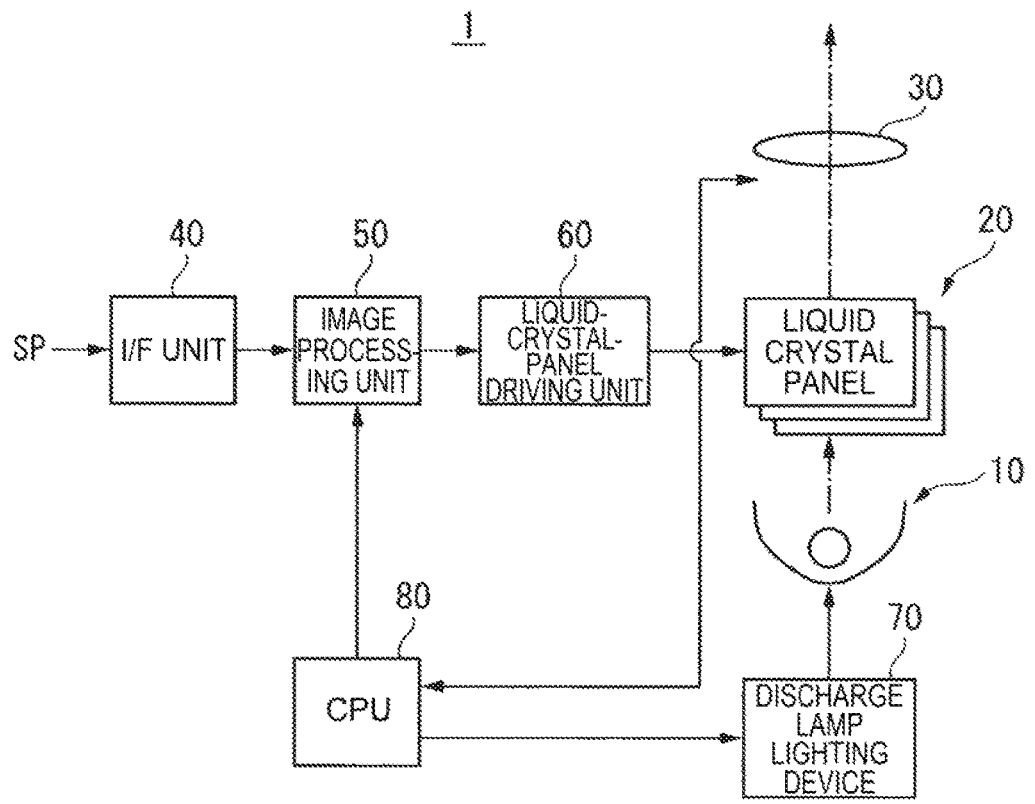
FIG. 1 is a block diagram showing an example of a functional configuration of a projector in an embodiment.

A discharge lamp lighting device, a discharge lamp lighting method, and a projector according to an embodiment of the invention are explained below with reference to the drawings.

The scope of the invention is not limited to the embodiment explained below and can be arbitrarily changed within the range of the technical idea of the invention. In the drawings referred to below, to clearly explain components, scales, numbers, and the like in structures are sometimes shown different from those of actual structures.

FIG. 1 is a block diagram showing an example of a functional configuration of a projector 1 according to an embodiment.

The projector 1 according to this embodiment includes, as shown in FIG. 1, a discharge lamp 10, liquid crystal panels 20, a projection optical system 30, an interface (I/F) unit 40, an image processing unit 50, a liquid-crystal-panel driving unit 60, a discharge lamp lighting device 70, and a CPU (Central Processing Unit) 80.

The discharge lamp 10 is used as a light source of the projector 1. In this embodiment, the discharge lamp 10 is, for example, a high pressure mercury lamp that makes use of arc discharge. The discharge lamp 10 is not particularly limited. Any other discharge lamps such as a metal halide lamp and a Xenon lamp may be used.

The liquid crystal panels 20 modulate and transmit irradiation light from the discharge lamp 10 according to an image to be projected.

The projection optical system 30 projects transmitted light transmitted through the liquid crystal panels 20 on a screen (not shown in the figure).

The interface unit 40 converts an image signal SP inputted from a not-shown personal computer or the like into image data of a form processable by the image processing unit 50.

The image processing unit 50 applies various kinds of image processing such as luminance adjustment and color balance adjustment to the image data supplied from the interface unit 40.

The liquid-crystal-panel driving unit 60 drives the liquid crystal panels 20 on the basis of the image data subjected to the image processing by the image processing unit 50.

The discharge lamp lighting device 70 includes a resonance circuit unit 73 functioning as an igniter. The discharge lamp lighting device 70 supplies high-frequency alternating-current power to the discharge lamp 10 via the resonance circuit unit 73 to thereby start electric discharge of the discharge lamp 10 and light the discharge lamp 10. In a lighting start period P1 included in a period up to time when the discharge lamp 10 reaches a steady lighting state, the discharge lamp lighting device 70 is configured to change stepwise a frequency fs of alternating-current power, which is supplied from, a power converting unit 72, across a basic frequency period Pf (see FIG. 6 as explained below) in which alternating-current power having a predetermined basic frequency (a second frequency) fo different from a resonance frequency (a first frequency) for causing resonance of the resonance circuit unit 73 is supplied to the discharge lamp 10. Details of the discharge lamp lighting device 70 are explained below.

The CPU 80 controls the image processing unit 50 and the projection optical system 30 according to operation of a remote controller (not shown in the figure) and operation buttons (not shown in the figure) provided in a main body of the projector 1. In this embodiment, the CPU 80 has a function of instructing the discharge lamp lighting device 70 to light the discharge lamp 10, for example, when a user operates a power switch (not shown in the figure) of the projector 1.

The configuration of the discharge lamp lighting device 70 is explained more in detail.

Figure 2:
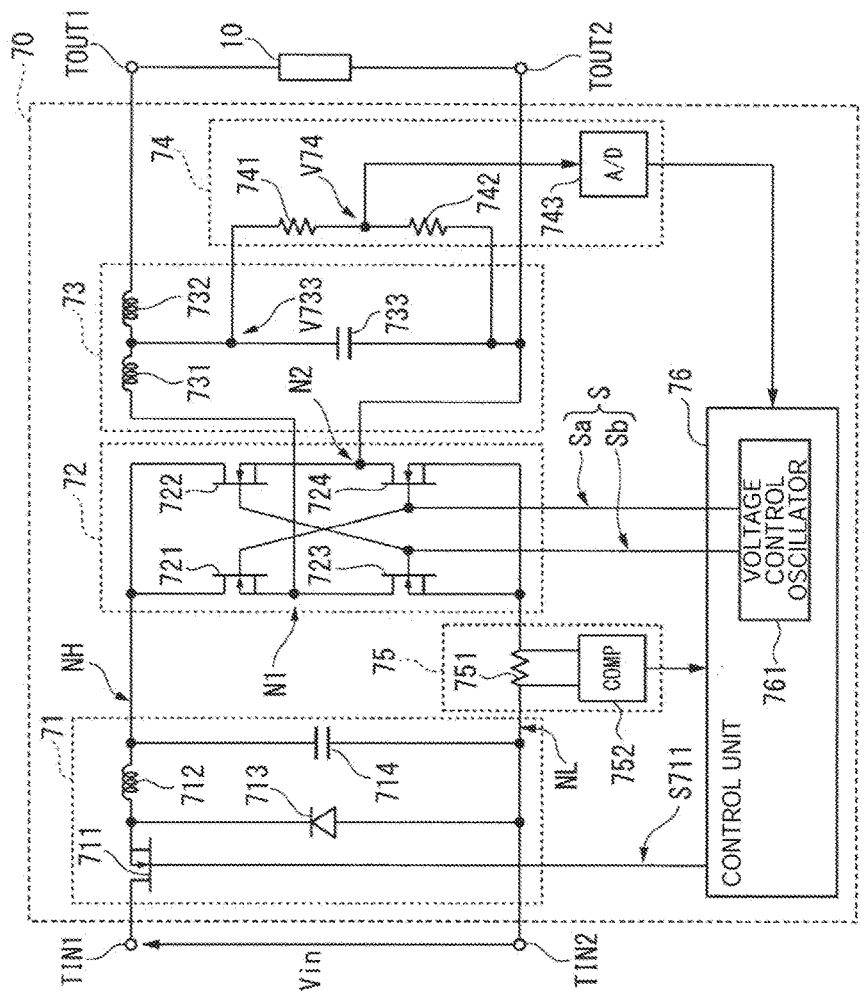
FIG. 2 is a block diagram showing an example of a functional configuration of a discharge lamp lighting device included in the projector in the embodiment.

FIG. 2 is a diagram showing an example of a functional configuration of the discharge lamp lighting device 70.

The discharge lamp lighting device 70 includes a down chopper unit 71, the power converting unit 72, the resonance circuit unit 73, a voltage detecting unit 74, a lighting detecting unit 75, and a control unit 76.

The down chopper unit 71 converts direct-current power having a voltage Vin applied between an input terminal TIN1 and an input terminal TIN2 from a direct-current power supply (not shown in the figure) into direct-current power having a predetermined direct-current voltage.

The down chopper unit 71 includes an n-channel type field effect transistor 711, a choke coil 712, a diode 713, and a capacitor 714. The down chopper unit 71 chops, on the basis of a control signal S711 supplied from the control unit 76, an electric current flowing through the n-channel type field effect transistor 711 to thereby obtain direct-current power having a desired output voltage corresponding to a duty ratio of the control signal S711. In this embodiment, an output voltage of the down chopper unit 71 is, for example, 380 V but is not limited to this.

The down chopper unit 71 is not a component essential for the projector 1 according to this embodiment and may be omitted.

The power converting unit 72 converts the direct-current power supplied from the down chopper unit 71 into alternating-current power and supplies the alternating-current power to the discharge lamp 10 via the resonance circuit unit 73. The power converting unit 72 is a full-bridge circuit including n-channel type field effect transistors 721, 722, 723, and 724.

Drains of the n-channel type field effect transistors 721 and 722 are connected to a high-potential node NH linked to an input terminal TIN1 via the n-channel type field effect transistor 711 and the choke coil 712, which configure the down chopper unit 71. Sources of the n-channel field effect transistors 721 and 722 are respectively connected to drains of the n-channel type field effect transistors 723 and 724. Sources of the n-channel type field effect transistors 723 and 724 are connected to, via a resistor 751, which configures the lighting detecting unit 75, a low-potential node NL linked to an input terminal TIN2.

A control signal Sa is supplied to gates of the n-channel type field effect transistors 721 and 724 from the control unit 76. A control signal Sb equivalent to an inverted signal of the control signal Sa is supplied to gates of the n-channel type field effect transistors 722 and 723 from the control unit 76.

In this embodiment, a connecting section between the source of the n-channel type field effect transistor 721 and the drain of the n-channel type field effect transistor 723 is set as one output node N1 of the power converting unit 72. A connecting section between the source of the n-channel type field effect transistor 722 and the drain of the n-channel type field effect transistor 724 is set as the other output node N2 of the power converting unit 72.

A pair of the n-channel type field effect transistors 722 and 723 and a pair of the n-channel type field effect transistors 721 and 724 are complementarily switched on the basis of the control signal S (Sa and Sb) supplied from the control unit 76, whereby 380 V and 0 V are respectively complementarily output from the output nodes N1 and N2. That is, the power converting unit 72 converts direct-current power into alternating-current power according to the switching operation of the n-channel type field effect transistors 721, 722, 723, and 724. The alternating-current power is a rectangular wave. A basic frequency of the alternating-current power is the frequency fs. The frequency fs of the alternating-current power coincides with a clock frequency of the control signal S supplied from the control unit 76. In this embodiment, both of the frequency of the control signal S supplied from the control unit 76 and the frequency of the alternating-current power supplied from the power converting unit 72 are the "frequency fs".

The resonance circuit unit 73 functions as an igniter that generates a high voltage exceeding a discharge start voltage (a breakdown voltage) of the discharge lamp 10. The resonance circuit unit 73 includes two magnetically-coupled coils 731 and 732 and a capacitor 733. The discharge lamp 10 is connected to the resonance circuit unit 73 via output terminals TOUT1 and TOUT2.

One end of the coil 731 is connected to the output node N1 of the power converting unit 72. The other end of the coil 731 is connected to one end of the coil 732. The other end of the coil 732 is connected to the output terminal TOUT1. One electrode of the capacitor 733 is connected to a connection node between the coil 731 and the coil 732. The other electrode of the capacitor 733 is connected to the output node N2 of the power converting unit 72 and connected to the output terminal TOUT2.

In this embodiment, an LC series resonance circuit is formed by the coil 731 and the capacitor 733 configuring the resonance circuit unit 73. Basically, a resonance frequency of the LC series resonance circuit (a resonance frequency set by the coil 731 and the capacitor 733) is a resonance frequency (a first frequency) fr peculiar to the resonance circuit unit 73.

In this embodiment, the resonance frequency fr is set to, for example, 390 kHz. Therefore, if the frequency fs of the alternating-current power supplied from the power converting unit 72 coincides with the resonance frequency fr of the resonance circuit unit 73 and the LC series resonance circuit configured by the coil 731 and the capacitor 733 changes to a resonance state, in principle, an inter-terminal voltage V733 of the capacitor 733 is infinitely large. A high voltage necessary for starting electric discharge of the discharge lamp 10 is obtained by the resonance circuit unit 73.

However, as explained below, since a triple resonance mode is used in this embodiment, the frequency fs of the alternating-current power supplied from the power converting unit 72 when the resonance circuit unit 73 is in the resonance state is a frequency one third of the resonance frequency fr peculiar to the resonance circuit unit 73. That is, when an N times resonance mode is used, the frequency fs of the alternating-current power supplied from the power converting unit 72 when the resonance circuit unit 73 is in the resonance state is a frequency one Nth of the resonance frequency fr of the resonance circuit unit 73.

However, even if the LC series resonance circuit is in the resonance state, if resistance components and wiring impedance of the n-channel type field effect transistors 721, 722, 723, and 724 configuring the power converting unit 72 are present, the inter-terminal voltage V733 of the capacitor 733 generally stays at about a voltage equal to or higher than 1 kV and equal to or lower than 1.5 kV. The high voltage necessary for starting the electric discharge of the discharge lamp 10 is not obtained. Therefore, in this embodiment, the resonance circuit unit 73 includes the coil 732 magnetically coupled to the coil 731 configuring the LC series resonance circuit. The inter-terminal voltage V733 of the capacitor 733 is amplified according to a winding ratio of the coil 731 and the coil 732, whereby a high voltage of several kilovolts necessary for starting the electric discharge of the discharge lamp 10 is finally generated.

In this embodiment, the resonance circuit unit 73 uses a so-called triple resonance mode to thereby resonate at a triple frequency of the frequency fs of the alternating-current power supplied from the power converting unit 72 in the lighting start period P1. The triple resonance mode makes use of an oscillation component of a waveform of the alternating-current power output, from the power converting unit 72. In principle, the power converting unit 72 outputs a rectangular wave as a waveform of the alternating-current power. The waveform includes a harmonic component. Making use of the harmonic component, the resonance circuit unit 73 is designed to resonate at the triple frequency of the frequency fs of the alternating-current power output from the power converting unit 72 in the lighting start period P1. That is, the resonance frequency fr of the resonance circuit unit 73 is set to the triple frequency of the frequency fs of the alternating-current power output from the power converting unit 72 in the lighting start period P1.

In this embodiment, the resonance frequency fr of the resonance circuit unit 73 is set to 390 kHz. When the alternating-current power of 130 kHz is supplied from the power converting unit 72, the resonance circuit unit 73 resonates at a triple frequency 390 kHz of the frequency 130 kHz according to the triple resonance mode. In this way, if the triple resonance mode is used, the resonance frequency fr of the resonance circuit unit 73 can be relatively set high with respect to the frequency fs of the alternating-current power. Therefore, compared with when the triple resonance mode is not used, values of inductance components of the coils 731 and 732 configuring the resonance circuit unit 73 and a capacitance component of the capacitor 733 can be set small. Consequently, it is possible to configure the resonance circuit unit 73 small.

The resonance circuit unit 73 does not have to include the coil 732 of the coils 731 and 732. For example, when a voltage for lighting of the discharge lamp 10 is low or when the influence of elements and patterns is small and the inter-terminal voltage V733 is large, the coil 732 is unnecessary. Consequently, the resonance circuit unit 73 can be configured small.

Therefore, the resonance circuit unit 73 can be configured smaller when the resonance frequency fr of the resonance circuit unit 73 is adjusted to the triple frequency (390 kHz) of the frequency fs of the alternating-current power using the triple resonance mode than when the resonance frequency fr of the resonance circuit unit 73 is adjusted to the frequency fs (130 kHz) of the alternating-current power output from the power converting unit 72 in the lighting start period P1. Even if the resonance frequency fr of the resonance circuit unit 73 is set high, the frequency fs of the alternating-current power output by the power converting unit 72 can be set relatively low by using the triple resonance mode. Therefore, a switching operation in a high-voltage region by the power converting unit 72 can be stabilized. It is possible to reduce a load on the power converting unit 72.

In this way, the frequency fs of the alternating-current power in causing the resonance of the resonance circuit unit 73 in the triple resonance mode has a technical meaning same as that of the resonance frequency fr peculiar to the resonance circuit unit 73 in terms of changing the resonance circuit unit 73 to the resonance state. In appearance, the frequency fs can be treated as a resonance frequency of the resonance circuit unit 73. Therefore, in the following explanation, the frequency fs of the alternating-current power of the power converting unit 72 that causes the resonance of the resonance circuit unit 73 in the triple resonance mode is referred to as "resonance frequency fsr of the resonance circuit unit 73" or simply as "resonance frequency fsr". The resonance frequency (first frequency) fsr is stored in, for example, a not-shown storing unit included in the control unit 76.

In this embodiment, the triple resonance mode is not always an essential element. When the triple resonance mode is not used, that is, when a single resonance mode is used, the resonance frequency fsr coincides with the resonance frequency fr peculiar to the resonance circuit unit 73. In this embodiment, as an example, the resonance circuit unit 73 resonates in the triple resonance mode. However, the resonance circuit unit 73 is not limited to the triple resonance mode and may resonate using K (N is an odd number) times resonance mode. In this case, the resonance frequency fsr is defined as a frequency for causing the resonance in the resonance circuit unit 73 in any N times resonance mode including the resonance frequency fr peculiar to the resonance frequency unit 73, that is, the frequency of the alternating-current power supplied from the power converting unit 72 or the frequency of the control signal S.

The voltage detecting unit 74 detects the inter-terminal voltage V733 of the capacitor 733 configuring the resonance circuit unit 73. The voltage detecting unit 74 includes a resistor 741 and a resistor 742 connected in series between terminals of the capacitor 733 and an analog/digital converting unit 743.

The resistor 741 and the resistor 742 divide the inter-terminal voltage V733 of the capacitor 733 of the resonance circuit unit 73 to obtain a voltage V74 corresponding to a resistance ratio of the resistors 741 and 742. In this embodiment, the inter-terminal voltage V733 of the capacitor 733 is referred, to as "resonance output voltage V733". The analog/digital converting unit 743 converts the divided voltage V74 into digital data and outputs the digital data. In this embodiment, the voltage V74 is a voltage at an intermediate stage generated to match the resonance output voltage V733 to an input characteristic of the analog/digital converting unit 743. The digital data output by the analog/digital converting unit 743 represents a value of the resonance output voltage V733. The resonance output voltage V733 detected by the voltage detecting unit 74 is supplied to the control unit 76.

The lighting detecting unit 75 detects lighting/non-lighting of the discharge lamp 10. The lighting detecting unit 75 includes a resistor 751 and a comparator unit 752.

The resistor 751 is connected between the input terminal TIN2 and the sources of the n-channel type field effect transistors 723 and 724 configuring the power converting unit 72. An inter-terminal voltage (a drop voltage) of the resistor 751 is input to the comparator unit 752. The comparator unit 752 detects, on the basis of the inter-terminal voltage of the resistor 751, an electric current flowing through the discharge lamp 10 and compares the detected electric current and a predetermined voltage value (not shown in the figure) corresponding to an electric current flowing through the resistor 751 when the discharge lamp 10 is lit to thereby detect lighting/non-lighting of the discharge lamp 10. That is, for example, when the inter-terminal voltage of the resistor 751 is equal to or higher than a predetermined voltage value, the lighting detecting unit 75 detects the lighting of the discharge lamp 10. When the inter-terminal voltage of the resistor 751 is lower than the predetermined voltage value, the lighting detecting unit 75 detects the non-lighting of the discharge lamp 10. When detecting the lighting of the discharge lamp 10, the lighting detecting unit 75 outputs a signal indicating to that effect to the control unit 76.

The control unit 76 controls switching operations of the down chopper unit 71 and the power converting unit 72. In this embodiment, the control unit 76 controls the frequency fs of the alternating-current power supplied to the resonance circuit unit 73 in the lighting start period P1 and an electrode heating period P2 up to time when the discharge lamp 10 reaches a steady lighting period P3.

In the lighting start period P1, the control unit 76 controls a switching operation of the power converting unit 72 to change stepwise the frequency fs of the alternating-current power, which is supplied from the power converting unit 72 to the resonance circuit unit 73, across the basic frequency period Pf in which alternating-current power having a basic frequency fo different from the resonance frequency fsr of the resonance circuit unit 73 is supplied to the discharge lamp 10.

In the electrode heating period P2, the control unit 76 controls the switching operation of the power converting unit 72 such that the frequency fs of the alternating-current power supplied from the power converting unit 72 to the resonance circuit unit 73 changes to an electrode heating frequency fh, which is a frequency that can efficiently heat the electrodes of the discharge lamp 10 in a short time.

In this embodiment, the basic frequency fo is a frequency higher than the resonance frequency fsr of the resonance circuit unit 73 and is a frequency equal to or higher than 100 kHz. In other words, the resonance frequency fsr is a frequency lower than the basic frequency fo. The basic frequency fo is arbitrarily set in this range of the frequency. When the frequency is set to 100 kHz or higher, a load on the discharge lamp 10 in the lighting start period P1 can be appropriately reduced.

More specifically, the basic frequency fo can be set to, for example, 145 kHz or higher and 170 kHz or lower. By setting the basic frequency fo to 145 kHz or higher, it is possible to easily suppress the resonance circuit unit 73 from reaching the resonance state (a state in which the resonance output voltage V733 increases). By setting the basic frequency fo to 170 kHz or lower, it is possible to reduce a switching loss between the resonance circuit unit 73 and the power converting unit 72.

In this embodiment, the electrode heating frequency fh is set to, for example, 60 kHz. Consequently, it is possible to increase a value of an electric current flowing to the discharge lamp 10 in a range in which an overload is not applied to the electrodes and efficiently heat the electrodes.

The control unit 76 includes a voltage control oscillator 761. The voltage control oscillator 761 outputs a signal of a frequency corresponding to an input voltage (not shown) as the control signal S. The signal for specifying the input voltage of the voltage control oscillator 761 is generated by the control unit 76 such that the switching operation of the power converting unit 72 as explained below is obtained.

An overview of a lighting operation of the discharge lamp 10 in the projector 1 in this embodiment is explained.

FIG. 3A is a diagram for explaining the overview of the lighting operation of the discharge lamp 10 in the projector 1 in this embodiment and is a diagram showing a waveform of the resonance output voltage V733 in the resonance circuit unit 73 up to time when the discharge lamp 10 changes to a stable lighting state.

As shown in FIG. 3A, in the projector 1 in this embodiment, the discharge lamp 10 shifts to the steady lighting period P3, in which the discharge lamp 10 is in the stable lighting state, through the lighting start period P1 and the electrode heating period P2.

As explained above, the lighting start period P1 includes the period in which the alternating-current power is supplied to the discharge lamp 10 to change stepwise the frequency fs of the alternating-current power supplied from the power converting unit 72, the steps being on either side of or alternating with the basic frequency period Pf in which the alternating-current power having the predetermined basic frequency fo different from the resonance frequency fsr of the resonance circuit unit 73 is supplied to the discharge lamp 10. As explained in detail below, in this period, the frequency fs is changed stepwise to a frequency same as the resonance frequency fsr. Consequently, in the lighting start period P1, the alternating current power having both the resonance frequency fsr and the basic frequency fo different from the resonance frequency fsr is supplied to the discharge lamp 10.

When the frequency fs is changed to the frequency same as the resonance frequency fsr, numerical values of the frequency fs and the resonance frequency fsr do not need to strictly coincide with each other. The frequency is may be set to a value near the resonance frequency fsr. Similarly, when the alternating-current power having the resonance frequency fsr and the basic frequency fo is supplied to the discharge lamp 10, an alternating-current power having a frequency near the resonance frequency fsr and the basic frequency fo may be supplied to the discharge lamp 10.

Length t1 of the lighting start period P1 is determined according to a discharge state that occurs between the electrodes.

FIG. 3B is a diagram for explaining a change in the discharge stage between the electrodes. FIG. 3B and FIG. 3A show a correspondence relation between the change in the discharge state between the electrodes and a waveform of the resonance output voltage V733 in the resonance circuit unit 73.

As shown in FIG. 3B, after an dielectric breakdown occurs and the discharge lamp 10 transitions from a non-discharge state D0 to the discharge state, the discharge state between the electrodes in the discharge lamp 10 transitions in the order of a glow discharge state D1, a mixed state D2, and an arc discharge state D3. That is, an electric discharge in the discharge lamp 10 shifts from glow discharge to arc discharge according to heating of the electrodes. In a process of the shift, the mixed state D2 occurs in which the glow discharge and the arc discharge are mixed in the discharge lamp 10.

Figure 4:
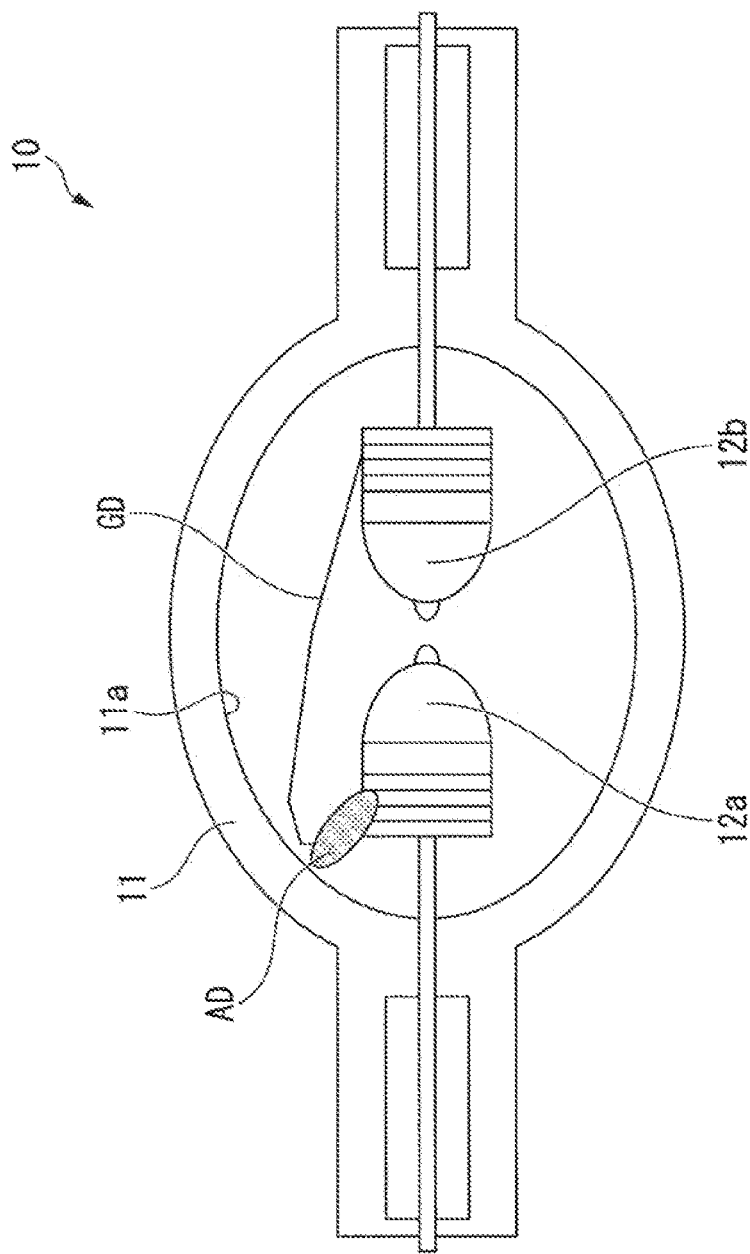
FIG. 4 is a diagram of a discharge state in the discharge lamp in the embodiment.

FIG. 4 is a schematic diagram showing the discharge state in the discharge lamp 10 in the mixed state D2.

As shown in FIG. 4, in the mixed state D2, glow discharge GD and arc discharge AD are mixed between electrodes 12a and 12b. In the mixed state D2, the arc discharge AD tends to occur between the rear ends of the electrodes 12a and 12b closer to an inner wall 11a of a discharge tube 11 and the inner wall 11a. In FIG. 3A, the resonance output voltage V733 in the mixed state D2 is described as being symmetrical in plus and minus polarities. However, actually, since the arc discharge is unstable, the discharge output voltage V733 often has a waveform biased to one polarity.

As shown in FIGS. 3A and 3B, the length t1 of the lighting start period P1 is set to length sufficient for the discharge state of the discharge lamp 10 to change to the arc discharge state D3. In other words, the length t1 of the lighting start period P1 is set to be equal to or larger than added-up length of the length of a period in which the discharge lamp 10 is in the glow discharge state D1 and the length of a period in which the discharge lamp 10 is in the mixed state D2. The lighting start period P1 can be set to, for example, 0.5 s or longer.

The resonance output voltage V733 in the lighting start period P1 is a high voltage in the non-discharge state D0 in a period of occurrence of the glow discharge. On the other hand, when a dielectric breakdown occurs and the discharge lamp 10 shifts to the glow discharge state D1, an electric current flows between the electrodes of the discharge lamp 10. Therefore, the resonance output voltage V733 instantaneously drops. Then, the resonance output voltage V733 slowly drops from the glow discharge state D1 to the mixed state D2. When the discharge lamp 10 shifts to the arc discharge state D3, since the discharge state is stabilized, the resonance output voltage V733 further drops.

After the dielectric breakdown occurs and electric discharge occurs, that is, when the discharge state in the discharge lamp 10 is the glow discharge state D1, the mixed state D2, and the arc discharge state D3, the alternating-current power supplied in the lighting start period P1 may be the alternating-current power having the resonance frequency fsr and the basic frequency fo explained above or may be alternating-current power having only the basic frequency fo.

The electrode heating period P2 is a period in which, after the discharge lamp 10 is lit, the frequency fs of the supplied power is set to the electrode heating frequency fh to heat the electrodes 12a and 12b in a short time. After the electrodes of the discharge lamp 10 are sufficiently heated in the electrode heating period P2, the discharge lamp 10 shifts to the steady lighting period P3. Consequently, it is possible to stabilize the arc discharge AD that occurs in the discharge lamp 10. A period for limiting an electric current until the entire discharge lamp 10 is heated, is sometimes provided as a launching period between the electrode heating period P1 and the steady lighting period P3.

In the electrode heating period P2, according to the heating of the electrodes 12a and 12b, a value of the resonance output voltage V733 gradually decreases.

Length t2 of the electrode heating period P2 is not particularly limited and is within a range in which the electrodes 12a and 12b can be sufficiently heated. The length t2 of the electrode heating period P2 can be set to, for example, 2.4 s.

The operation of the discharge lamp lighting device 70 in the lighting operation of the discharge lamp 10 is explained.

Figure 5:
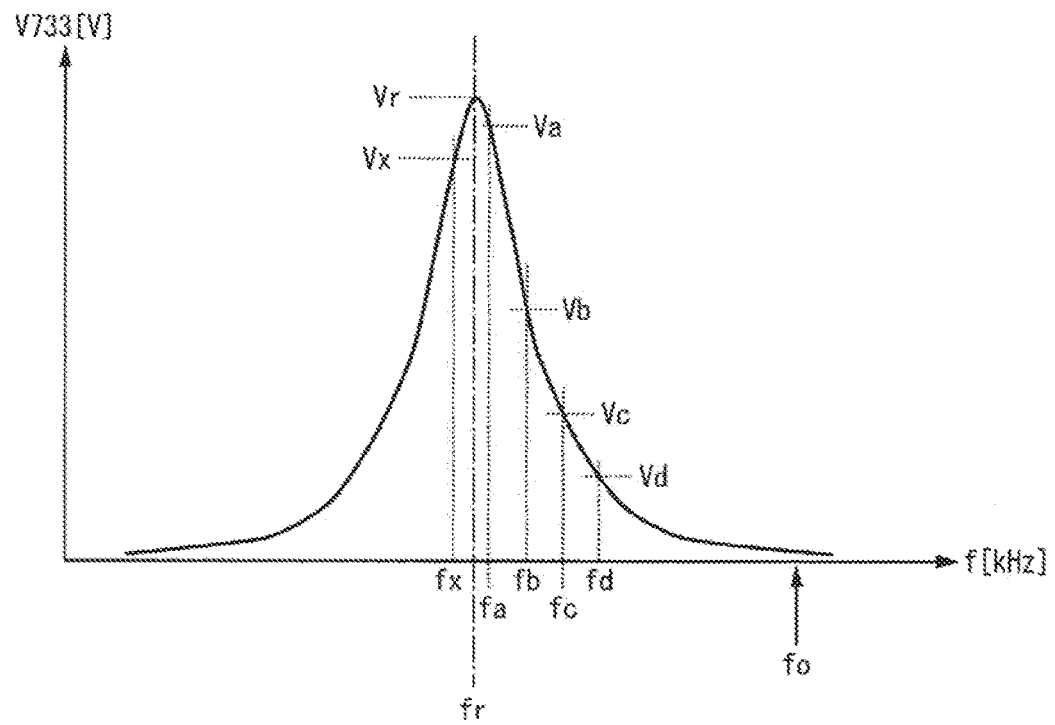
FIG. 5 is an explanatory diagram for explaining an overview of the operation of the discharge lamp lighting device included in the projector in the embodiment.

FIG. 5 is an explanatory diagram for explaining an overview of the operation of the discharge lamp lighting device 70 according to this embodiment. FIG. 5 shows frequency dependency (a resonance characteristic) of the resonance output voltage V733 of the resonance circuit unit 73.

As shown in FIG. 5, when a frequency f of a harmonic wave included in the alternating-current power supplied to the resonance circuit unit 73 in the triple resonance mode coincides with the resonance frequency fr (390 kHz) of the resonance circuit unit 73, the resonance output voltage V733 in the resonance circuit unit 73 indicates a peak voltage Vr (a maximum). Therefore, even if the resonance frequency fr fluctuates, by setting the frequency fs of the alternating-current power of the power converting unit 72 to the frequency at which the resonance output voltage V733 indicates the peak voltage Vr (the maximum), it is possible to obtain the high voltage necessary for starting the electric discharge of the discharge lamp 10.

Therefore, in this embodiment, the control unit 76 changes stepwise, starting from a predetermined frequency fd sufficiently higher than the resonance frequency far of the resonance circuit unit 73, the frequency fs of the alternating-current power supplied from the power converting unit 72 to decrease from the frequency fd to the resonance frequency fsr in the order of a frequency fc, a frequency fb, a frequency fa, and a frequency fx across the basic frequency period Pf in which the electric power is set to the predetermined basic frequency fo different from the resonance frequency fsr of the resonance circuit unit 73. The control unit 76 specifies the resonance frequency fsr or a frequency near the resonance frequency fsr from the resonance output voltage V733 with respect to the frequencies excluding the basic frequency fo, that is, a voltage Vc, a voltage Vb, a voltage Va, and a voltage Vx. In this embodiment, since the triple resonance mode is used, a frequency about one third of the resonance frequency fr peculiar to the resonance circuit unit 73 is specified as the resonance frequency fsr.

In this embodiment, the frequencies fa, fb, fc, fd, and fx excluding the basic frequency fo are referred to as "driving frequency (first frequency)" and distinguished from the basic frequency fo. The basic frequency fo and the driving frequencies fa, fb, fc, fd, and fx indicate the frequency fs of the alternating-current power supplied from the power converting unit 72. As explained above, the frequency fs of the alternating-current power coincides with the frequency of the control signal S supplied from the control unit 76. Therefore, the basic frequency fo and the driving frequencies fa, fb, fc, fd, and fx mean the frequency of the control signal S generated by the control unit 76. The frequency fs of the alternating-current power supplied from the power converting unit 72 is set to the basic frequency fo or the driving frequencies fa, fb, fc, fd, and fx by the control unit 76. However, the number of driving frequencies is not limited to this example and may be arbitrarily increased.

The driving frequencies fa, fb, fc, fd, and fx are generated at an interval of a fixed frequency step. That is, the control unit 76 changes (reduces) stepwise the frequency fs of the alternating-current power, which is supplied from the power converting unit 72, from the frequency fd to the resonance frequency fsr at the fixed frequency step. However, the frequency step is not limited to this example and, for example, may be set smaller near the resonance frequency fsr.

The driving frequency fd set as the frequency fs first in a process for changing the frequency fs of the alternating-current power stepwise is the frequency sufficiently higher than the resonance frequency fsr as explained above. However, preferably, the driving frequency fd is set to a value exceeding a fluctuation range of the resonance frequency fsr. Consequently, even if the apparent resonance frequency fsr fluctuates because the resonance frequency fr peculiar to the resonance circuit unit 73 fluctuates, it is possible to detect the peak voltage Vr of the resonance output voltage V733 in a process for changing stepwise the frequency fs of the alternating-current power stepwise supplied from the power converting unit 72 as explained above.

Figure 6:
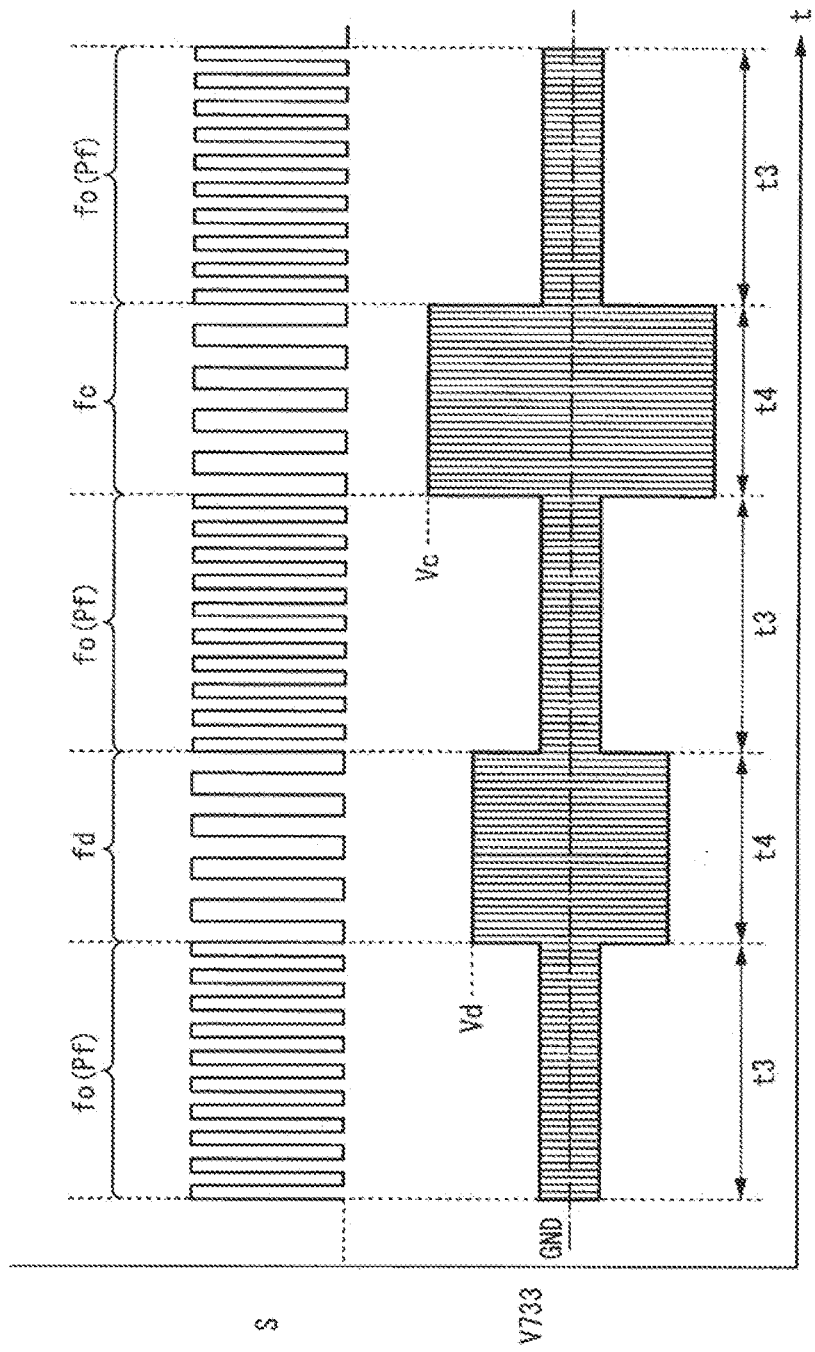
FIG. 6 is an explanatory diagram for explaining an overview of the operation of the discharge lamp lighting device included in the projector in the embodiment.

FIG. 6 is a schematic diagram showing a correspondence relation between the control signal S for giving the frequency fs of the alternating-current power (a waveform shown in the upper part of the figure) and a waveform of the resonance output voltage V733 in the resonance circuit unit 73 (a waveform shown in the lower part of the figure). As the waveform of the resonance output voltage V733, a waveform in the non-discharge state D0 of the discharge lamp 10 is shown.

As shown in the upper part of FIG. 6, the control signal S alternately includes the basic frequency fo and the driving frequencies (fc and fd) reduced stepwise. In this example, the frequency fs of the control signal S is set to the basic frequency fo first, set to the driving frequency fd next, set to the basic frequency fo again next, and set to the frequency fc next. As shown in the lower part of the figure, the amplitude of the resonance output voltage V733 decreases according to the basic frequency fo of the control signal S. The amplitude of the resonance output voltage V733 increases according to the driving frequencies (fc and fd) that decrease stepwise. Voltages Vc and Vd of the resonance output voltage V733 at this point correspond to the voltages Vc and Vd at the driving frequencies fc and fd shown in FIG. 5.

Time from the setting of the frequency fs to the basic frequency fo to the switching of the frequency fa to the driving frequency), that is, length t3 of the basic frequency periods Pf and time from the setting of the frequency fs to the driving frequency to the switching of the frequency fs to the basic frequency fo, that is, length (hereinafter, length of a driving frequency period) t4 of periods in which an alternating current having the driving frequency is supplied to the discharge lamp 10 are respectively arbitrarily set in a range in which a dielectric breakdown occurs between the electrodes 12a and 12b in the discharge lamp 10 in the lighting start period P1 and the discharge lamp 10 is lit.

The length t3 of the basic frequency period Pf can be set to, for example, 6 ms. The length t4 of the driving frequency period can be set to, for example, 2 ms. By setting the length t3 of the basic frequency period Pf and the length t4 of the driving frequency period in this way, it is possible to reduce a load on the discharge lamp 10 while reducing power consumption.

As explained above, in a process for reducing the frequency fs of the alternating-current power stepwise, the control unit 76 reduces the frequency fs of the alternating-current power stepwise on either side of the basic frequency period Pf until lighting of the discharge lamp 10 is detected by the lighting detecting unit 75. When the lighting of the discharge lamp 10 is detected by the lighting detecting unit 75 and the lighting start time P1 ends according to the elapse of a predetermined time, the control unit 76 sets the frequency fs of the alternating-current power to a predetermined frequency in the electrode heating period P2. That is, after arc discharge starts in the discharge lamp 10 (after the discharge lamp 10 changes to the arc discharge state D3), the frequency fs of the alternating-current power is set to be the predetermined frequency in the electrode heating period P2. The electrodes 12a and 12b are heated. Thereafter, the frequency fs of the alternating-current power is set to a frequency in the steady lighting period P3. Steady lighting (discharge) of the discharge lamp 10 is maintained.

In the process for reducing the frequency fs of the alternating-current power stepwise, while the discharge lamp 10 is not lit, when the frequency fs of the alternating-current power falls below the resonance frequency fsr and the resonance output voltage V733 detected by the voltage detecting unit 74 passes the peak voltage Vr shown in FIG. 5 and changes from rising to falling, the control unit 76 resets the frequency fs of the alternating-current power to a driving frequency set in an immediately preceding stage. Consequently, in the process for reducing the frequency fs of the alternating-current power stepwise, it is possible to set the frequency fs of the alternating-current power to a frequency at which the resonance output voltage V733 is the highest, that is, a driving frequency near the resonance frequency fsr at which it is most likely that an electric discharge is started. In this setting state, the control unit 76 waits for a discharge start of the discharge lamp 10. As explained below, when the discharge lamp 10 does not start the electric discharge even if a specified time elapses, an error is output to a system control unit of the projector 1.

A control procedure of the discharge lamp lighting device 70 by the control unit 76 in the projector 1 according to this embodiment is explained on the basis of the operation of the discharge lamp lighting device 70 explained above.

Figure 7:
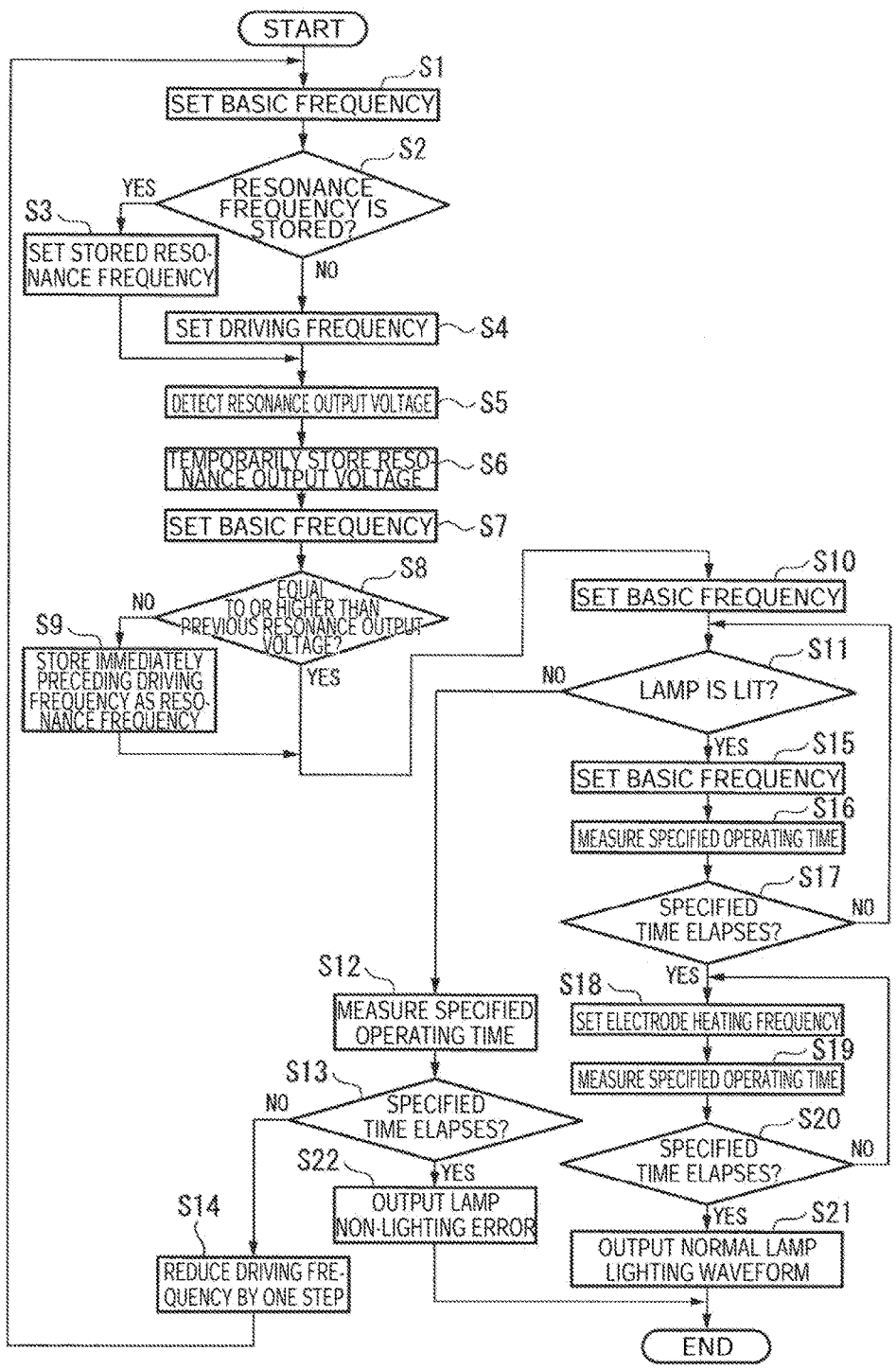
FIG. 7 is a flowchart for explaining an example of a lighting operation by a control unit in the embodiment.

FIG. 7 is a flowchart for explaining an example of a flow of a lighting operation by the control unit 76 in this embodiment.

First, when the user operates the power switch (not shown in the figure), the system control unit (not shown) configured by the CPU 80 of the projector 1 instructs the discharge lamp lighting device 70 to light the discharge lamp 10.

When receiving the instruction from the system control unit, the control unit 76 of the discharge lamp lighting device 70 causes, with a control signal S711, the down chopper unit 71 to start a switching operation, sets the basic frequency fo as the frequency fs of the control signal S (step S1), and causes, with the control signal S, the power converting unit 72 to start a switching operation.

Subsequently, the control unit 76 determines whether the resonance frequency fsr, that is, the frequency fs of the alternating-current power (the frequency of the control signal S) applied to the resonance circuit unit 73 corresponding to the resonance frequency fr is stored in the storing unit (not shown in the figure) included in the control unit 76 (step S2).

In this embodiment, if a lighting operation is performed in the past, a driving frequency at the time when an electric discharge of the discharge lamp 10 is started is stored in the storing unit as the resonance frequency fsr according to step S9 explained below in the lighting operation in the past. If the resonance frequency fsr is stored in the storing unit (YES in step S2), the control unit 76 sets a driving frequency to correspond to the stored resonance frequency fsr (step S3). It is assumed that the lighting operation is not performed in the past and the resonance frequency fsr of the lighting operation in the past is not stored in the storing unit included in the control unit 76 (NO in step S2).

If the resonance frequency fsr of the lighting operation in the past is not stored in the storing unit (MO in step S2), the control unit 76 sets the predetermined driving frequency fd as the frequency fs of the control signal S (step S4). In step S3, when the resonance frequency fsr is stored in the storing unit, the control unit 76 sets the driving frequency to correspond to the resonance frequency fsr.

The power converting unit 72 carries out the switching operation on the basis of the control signal S having the driving frequency fd and supplies alternating-current power having the driving frequency fd to the resonance circuit 73. In a section corresponding to the control signal S having the driving frequency fd, the voltage detecting unit 74 detects the resonance output voltage V733 (step S3). The control unit 76 temporarily stores the resonance output voltage V733 detected by the voltage detecting unit 74 in the storing unit (step S6).

Subsequently, the control unit 76 resets the frequency fs of the control signal S to the basic frequency fo (step S7). In a section of the control signal S having the basic frequency fo, the control unit 76 determines whether the detected resonance output voltage V733 is equal to or higher than the resonance output, voltage V733 detected before (step S8). Since the resonance output voltage V33 is a voltage obtained with respect to the first driving frequency fd, a value before the resonance output voltage V733 is absent. In this case, the control unit 76 determines that the detected resonance output voltage V733 is equal to or higher than the resonance output voltage V733 detected before (YES in step S8). Step S8 is a step for grasping whether the frequency fs of the control signal S exceeds the resonance frequency fsr shown in FIGS. 3A and 3B.

If the detected resonance output voltage V733 is lower than the resonance output voltage V733 detected before (NO in step S8), the control unit 76 causes the storing unit of the control unit 76 to store an immediately preceding driving frequency, that is, the frequency fd as a resonance frequency (step S9).

Subsequently, the control unit 76 sets the basic frequency fo as the frequency fs of the control signal S again (step S10). In a section of the control signal S having the basic frequency fo, the control unit 76 determines, on the basis of a detection result of the lighting detecting unit 75, whether the discharge lamp 10 is lit (step S11). If determining that the discharge lamp 10 is not lit (NO in step S11), the control unit 76 measures an operating time from the start of the lighting operation (step S12) and determines whether the operating time exceeds a specified operating time (step S13). If the operating time does not exceed the specified operating time (NO in step S13), the control unit 76 reduces the frequency fs of the control signal S and sets the frequency fs as the driving frequency fc (step S14). Thereafter, the control unit 76 returns the processing operation to step S1 and repeatedly executes the same steps until the control unit 76 determine in step S11 that the discharge lamp 10 is lit.

When a clock frequency of the control signal S is set to the frequency fc in step S14, if the control unit 76 determines in steps S11 that the discharge lamp 10 is lit (YES in step S11), the control unit 76 sets the frequency fs of the control signal S to the basic frequency fo (step S15) and measures the specified operating time (step S16). The control unit 76 determines whether the specified, operating time elapses (step S17). If the specified operating time does not elapse (NO in step S17), the control unit 76 repeats steps S11 to S17 until the specified operating time elapses. If the specified operating time elapses (YES in step S17), the control unit 76 sets the electrode heating frequency fh as the frequency fs of the control signal S (step 19).

The operating time measured in step S17 is an elapsed time from the start of the supply of the electric power to the discharge lamp 10, that is, an elapsed time from the start point in FIG. 7 and is equivalent to the length t1 of the lighting start period P1.

The control unit 76 measures the specified operating time after setting the electrode heating frequency fh as the frequency fs of the control signal S (step S19). The control unit 76 determines whether the specified operating time elapses (step S20). If the specified operating time does not elapse (NO in step S20), the control unit 76 repeats the steps S18 to S20 until the specified operating time elapses. If the specified operating time elapses (YES in step S20), the control unit 76 sets a predetermined frequency at normal lighting time as the frequency fs of the control signal S and outputs a normal lamp lighting signal waveform as the control signal S (step S21).

The specified operating time in step 320 is an elapsed time from the end of the lighting start period P1, that is, an elapsed time from the setting of the electrode heating frequency fh. The specified operating time at step S20 is equivalent to the time t2 of the electrode heating period P2.

If the discharge lamp 10 is not lit in step S11 (NO in step S11) and the specified operating time elapses in step S13 (YES in step S13), the control unit 76 outputs an lamp non-lighting error to the system control unit of the projector 1 (step S22). Consequently, under the control by the system control unit, via a not-shown display unit or the like, the user is notified to the effect that the lamp non-lighting error is generated. In this case, the system control unit of the projector 1 carries out predetermined processing for eliminating the error, for example, causes a fan for cooling the discharge lamp 10 to operate. The user who receives this notification can take measures, for example, suspend the use of the projector 1 for a fixed time.

The basic frequency fo in step S7 and the basic frequency fo in step S10 may be different as long as the basic frequencies fo are equal to or higher than 100 kHz, for example, 145 kHz and 160 kHz. The specified operating times in steps S13, S17, and S20 do not have to be the same specified operating time and may be different.

In the lighting operation, after the lighting is detected, the frequency fs is set to the basic frequency fo until the specified operating time elapses. However, the frequency fs is not limited to this. For example, in the lighting operation in this embodiment, even after the lighting is detected, as before the lighting is detected, the basic frequency fo and the driving frequency may be alternately set as the frequency fs until the specified operating time elapses, that is, the lighting start period P1 ends.

The operation procedure of the discharge lamp lighting device 70 according to the embodiment can also be represented as a discharge lamp lighting method. The discharge lamp lighting method can be represented as including a stage for converting, with the power converting unit 72, direct-current power into alternating-current power and supplying the alternating-current power to the discharge lamp 10 via the resonance circuit unit 73 and a stage for supplying, with the control unit 76, in the lighting start period P1 up to time when the discharge lamp 10 reaches the steady lighting state, alternating-current power having the resonance frequency fr for causing the resonance of the resonance circuit unit 73 and the basic frequency fo different from the resonance frequency fr to the discharge lamp 10. The basic frequency fo is equal to or higher than 100 kHz.

The discharge lamp lighting method in this embodiment can be represented as including a stage for changing, with the control unit 76, in the lighting start period P1 up to time when the discharge lamp 10 reaches the steady lighting state, the frequency fs of the alternating-current power stepwise across the basic frequency period Pf in which the alternating-current power having the basic frequency fo different from the resonance frequency fr for causing the resonance of the resonance circuit unit 73 is supplied to the discharge lamp 10.

According to this embodiment, during the lighting, the frequency fs of the alternating-current power supplied to the resonance circuit unit 73 is not continuously changed. The frequency fs of the alternating-current power is reduced stepwise to the resonance frequency fsr across the basic frequency period Pf in which the alternating-current power having the basic frequency fo different from the resonance frequency fsr of the resonance circuit unit 73 is supplied to the discharge lamp 10. Consequently, the resonance circuit unit 73 is prevented from being continuously placed in the quasi-resonance state or the resonance state. Therefore, according to this embodiment, a reactance component of the resonance circuit unit 73 temporarily becomes apparent in a section corresponding to the basic frequency fo. Therefore, the voltage and the electric current in the resonance circuit unit 73 are suppressed, and the power consumption in the resonance circuit unit 73 is suppressed.

According to this embodiment, it is possible to reduce damage to the discharge tube 11 when the discharge lamp 10 is lit. This is explained in detail below.

As explained above, while the electric discharge in the discharge lamp 10 shifts from the glow discharge GD to the arc discharge AD, as shown in FIG. 3B, the mixed state D2 in which the glow discharge GD and the arc discharge AD are mixed is present. As shown in FIG. 4, the arc discharge AD in the mixed state D2 tends to occur between the inner wall 11a of the discharge tube 11 and the rear ends of the electrodes 12a and 12b close to the inner wall 11a.

If an electric current value supplied to the discharge lamp 10 is large, energy of the arc discharge AD increases and the inner wall 11a is sometimes damaged. That is, when nigh temperature is applied by the arc discharge AD, for example, devitrification in which the discharge tube 11 is clouded sometimes occurs. Consequently, when the discharge lamp 10 is in the mixed state D2, if the electric current value supplied to the discharge lamp 10 is large, the life of the discharge lamp 10 is reduced.

On the other hand, according to this embodiment, in a period, in which the frequency fs of the alternating-current power is brought close to the resonance frequency fsr stepwise, the basic frequency period Pf in which the alternating-current power having the basic frequency fo higher than the resonance frequency fsr and equal to or higher than 100 kHz is supplied is interposed. Since the current value supplied to the discharge lamp 10 decreases as the frequency of the alternating-current power increases, when the basic frequency period Pf in which the frequency fs is the basic frequency fo equal to or higher than 100 kHz is provided, it is possible to reduce the current value of the alternating-current power in the lighting start period P1 of the discharge lamp 10. Therefore, according to this embodiment, it is possible to reduce damage to the discharge lamp 10 due to the arc discharge AD in the mixed state D2. It is possible to suppress the life of the discharge lamp 10 from being reduced.

According to this embodiment, the triple resonance mode is used and the value of the resonance frequency fsr is set to be equal to or higher than 100 kHz. Consequently, it is possible to set the driving frequency to be equal to higher than 100 kHz. Therefore, according to this embodiment, even while the frequency fs of the alternating-current power is set to the driving frequency, it is possible to reduce the current value supplied to the discharge lamp 10, it is possible to further reduce damage to the discharge lamp 10.

According fo this embodiment, the length t1 of the lighting start period P1 is set to length sufficient for the discharge lamp 10 to change to the arc discharge state D3. Consequently, in the mixed state D2, it is possible to suppress the alternating-current power having the electrode heating frequency fh in the electrode heating period P2 from being supplied to the discharge lamp 10. It is possible to suppress energy of the arc discharge AD in the mixed state D2 from increasing.

In this embodiment, since the resonance frequency fsr is set to 130 kHz, when the basic frequency fo different from the resonance frequency fsr and equal to or higher than 100 kHz is set, if the basic frequency fo is set to a frequency lower than the resonance frequency fsr, a range of frequencies that can be set is narrow.

On the other hand, according to this embodiment, since the basic frequency fo is set higher than the resonance frequency fsr, it is possible to expand the range of frequencies that can be set as the basic frequency fo.

Consequently, it is easy to set the basic frequency fo to a frequency that can suppress the resonance circuit unit 73 from reaching the resonance state (the state in which the resonance output voltage V733 increases).

In this embodiment, in the process for changing the frequency fs of the alternating-current power stepwise, since the resonance circuit unit 73 operates in a capacitive region, occurrence of an electric current flowing back from the resonance circuit unit 73 to the power converting unit 72 is prevented when the power converting unit 72 operates in an inductive region. Therefore, according to this embodiment, it is possible to prevent a loss due to the backflow current.

In this embodiment, configurations explained below can also be adopted.

For example, in the embodiment, the power converting unit 72 is configured by the full-bridge circuit. However, any circuit form such as a half bridge may be used as a circuit form of the power converting unit 72 as long as the alternating-current power can be supplied to the resonance circuit unit 73.

A circuit form of the voltage detecting unit 74 and the lighting detecting unit 75 is not limited to the embodiment. Any circuit form may be used.

In the embodiment explained above, the discharge lamp lighting device 70 is the component of the projector 1. However, the discharge lamp lighting device 70 may be configured as a device separate from the projector 1.

In the embodiment explained above, the control unit 76 sets the frequency fs to the resonance frequency fsr by detecting the resonance output voltage V733. However, the control unit 76 is not limited to this. In this embodiment, for example, the control unit 76 may set the frequency fs to the resonance frequency fsr by detecting a resonance output current.

In the embodiment explained above, the control unit 76 operates to check a lighting state of the discharge lamp 10 every time the control unit 76 sets the frequency fs to the driving frequency and returns the frequency fs to the basic frequency fo (step S11). However, the control unit 76 is not limited to this. In this embodiment, for example, the control unit 76 may operate to check the lighting state of the discharge lamp 10 after changing the driving frequency stepwise and setting the frequency fs to the resonance frequency fsr.

In the embodiment, explained above, in the lighting start period P1, the control unit 76 changes the driving frequency to the resonance frequency fsr stepwise. However, the control unit 76 is not limited to this.

In this embodiment, for example, the control unit 76 may set the driving frequency to the resonance frequency fsr from the beginning and not change the driving frequency. That is, in this embodiment, for example, in the lighting start period P1, the control unit 76 may be configured to supply alternating-current power alternately having the resonance frequency fsr and the basic frequency fo to the discharge lamp 10.

EXAMPLES

Examples are explained below.
In the examples explained below, a high pressure mercury lamp of rated 200 W was used as a discharge lamp.

Example 1

In this example, a relation between a current value between electrodes and a frequency of alternating-current power was measured.

Figure 8:
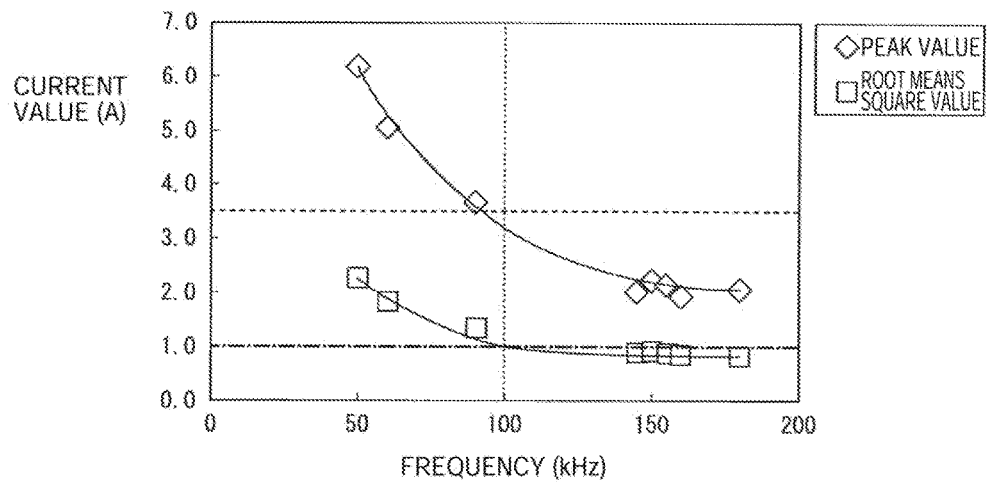
FIG. 8 is a graph showing a result of an example 1.

A simulative load was set to 60 V, the frequency of the alternating-current power input to the discharge lamp was changed between 50 kHz and 180 kHz, and the current value flowing between the electrodes was measured. A measured result is shown in FIG. 8. In FIG. 8, the ordinate indicates the current value (A) and the abscissa indicates the frequency (kHz).

It is seen from FIG. 8 that both of a peak value and a root mean square value of the current value decreased as the frequency increased. It is seen that, when the frequency was set to 100 kHz or higher, the peak value was equal to or smaller than 3.5 A and the root mean square value was equal to or smaller than 1.0 A. A change in the root means square value was substantially flat at about 1.0 A. Even if the frequency was set higher, the change in the room mean square value was hardly seen.

Consequently, it has been confirmed that, by setting the basic frequency to 100 kHz or higher, it is possible to effectively reduce the current value flowing to the discharge lamp and, in the lighting start period, it is possible to effectively suppress damage to the discharge lamp due to arc discharge.

A change in the peak value was substantially flat at about 2.0 A. Even if the frequency was set higher, the change in the peak value was hardly seen.

Consequently, it has been confirmed that, by setting the basic frequency to 143 kHz or higher at which both of the root mean square value and the peak value hardly change (not decrease), it is possible to effectively reduce the peak value of the current value and further suppress damage to the discharge lamp.

Example 2

In this example, a relation between a frequency of electric power input to a discharge lamp and a loss of a power converting unit was measured.

Figure 9:
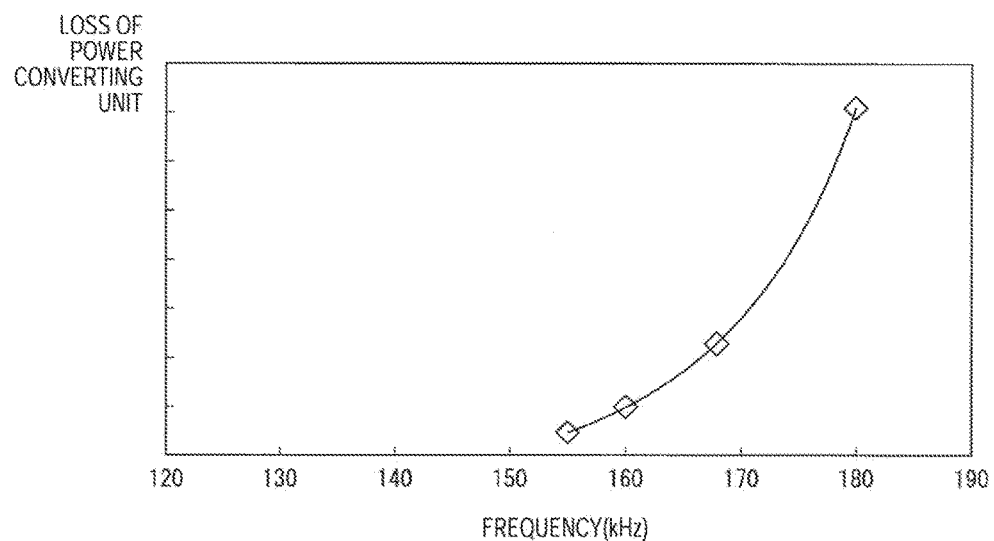
FIG. 9 is a graph showing a result of an example 2.

As in the example 1, a simulative load was set to 6.0 V, a frequency of alternating-current power was changed between 155 kHz and 180 kHz and a loss of the power converting unit was measured. The loss of the power converting unit is a switching loss between a resonance circuit unit and the power converting unit. A measured result is shown in FIG. 9. In FIG. 9, the ordinate indicates the loss (W) of the power converting unit and the abscissa indicates the frequency (kHz). In FIG. 9, the ordinate is standardized.

It is seen from FIG. 9 that the loss of the power converting unit increased as the frequency was higher. It is also seen that a ratio of a change in the loss of the power converting unit to a change in the frequency was larger as the frequency was higher. Consequently, it has been found that it is possible to effectively suppress the loss of the power converting unit by setting the basic frequency to be equal to or lower than 170 kHz.

Example 3

In this example, a change in a current value in lighting a discharge lamp was measured.

A resonance frequency of a resonance circuit unit used in the example was 390 kHz. A triple resonance mode was used. A basic frequency was set to 155 kHz and a driving frequency was changed to 140 kHz, 135 kHz, and 130 kHz. The length of a basic frequency period was set to 6 ms and the length of a driving frequency period was set to 2 ms.

In this example, a lighting start period P11 was set to 1.0 s and an electrode heating period P12 was set to 2.4 s. The discharge lamp was shifted to a steady lighting period P13.

Figure 10:
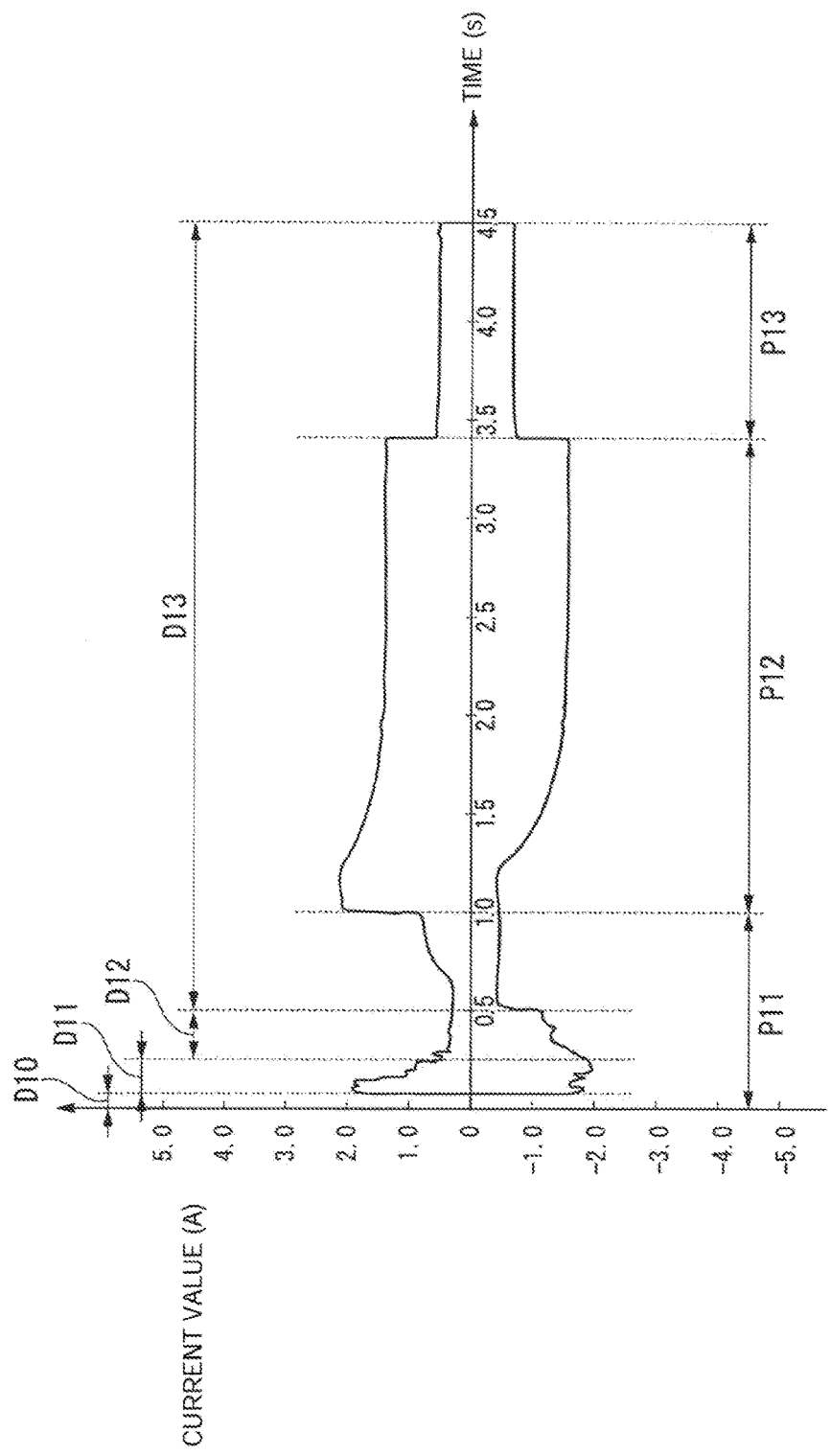
FIG. 10 is a graph showing a result of an example 3.

A measured result is shown in FIG. 10. In FIG. 10, the ordinate indicates the current value (A) and the abscissa indicates time (s). In FIG. 10, an envelope connecting vertexes of a waveform of the current value is shown.

It is seen from FIG. 10 that a state in the discharge lamp transitioned from a non-discharge state D10 in which an electric current did not flow because a dielectric breakdown did not occur to an arc discharge state D13 in which the current value was stable through a glow discharge state D11 in which the dielectric breakdown occurred and the current value irregularly fluctuated and a mixed state D12 in which glow discharge and arc discharge were mixed.

It has been confirmed that, in the lighting start period P11, the current value was suppressed to 2.0 A or less as a peak value and to 1.0 A or less as a root mean square value. Consequently, it has been confirmed that it is possible to reduce damage to the discharge lamp by setting the basic frequency to 100 kHz or higher.

It has been confirmed that, in the lighting start period P11, the discharge lamp shifted to the arc discharge state D13 at about 0.5 s. Consequently, it has been confirmed that that it is possible to effectively suppress damage to the discharge lamp by setting the lighting start period P11 to at least 0.5 s or longer.

The entire disclosure of Japanese Patent Application No. 2013-216107, filed Oct. 17, 2013 is expressly incorporated by reference herein.

What is claimed is:

1. A discharge lamp lighting device comprising:
a resonance circuit unit connected to a discharge lamp;
a power converting unit configured to convert direct-current power into alternating-current power and supply the alternating-current power to the discharge lamp via the resonance circuit unit; and
a control unit configured to supply the alternating-current power alternately having a first frequency and a second frequency different from the first frequency, to the discharge lamp in a lighting start period from a start of lighting of the discharge lamp to the time the discharge lamp is lit, wherein
the control unit changes stepwise the first frequency to decrease from a frequency higher than a frequency for causing resonance of the resonance circuit unit toward the frequency for causing the resonance, and
the second frequency is higher than the frequency for causing the resonance and equal to or higher than 100 kHz.

2. The discharge lamp lighting device according to claim 1, wherein the second frequency is equal to or higher than 145 kHz.

3. A projector comprising:
a discharge lamp;
the discharge lamp lighting device according to claim 2 configured to light the discharge lamp; and
a projection optical system configured to project light that is irradiated from the discharge lamp and modified.

4. The discharge lamp lighting device according to claim 1, wherein the second frequency is equal to or lower than 170 kHz.

5. A projector comprising:
a discharge lamp;
the discharge lamp lighting device according to claim 4 configured to light the discharge lamp; and a projection optical system configured to project light that is irradiated from the discharge lamp and modified.

6. The discharge lamp lighting device according to claim 1, wherein
the first frequency is equal to or higher than 100 kHz.

7. A projector comprising:
a discharge lamp;
the discharge lamp lighting device according to claim 6 configured to light the discharge lamp; and
a projection optical system configured to project light that is irradiated from the discharge lamp and modified.

8. The discharge lamp lighting device according to claim 1, wherein
the second frequency is higher than the first frequency.

9. A projector comprising:
a discharge lamp;
the discharge lamp lighting device according to claim 8 configured to light the discharge lamp; and
a projection optical system configured to project light that is irradiated from the discharge lamp and modified.

10. The discharge lamp lighting device according to claim 1, wherein
the resonance circuit unit includes a coil and a capacitor, and
a resonance output voltage of the capacitor increases according to the decrease in the first frequency toward the frequency for causing the resonance.

11. The discharge lamp lighting device according to claim 10, further comprising
a voltage detecting unit configured to detect the resonance output voltage of the capacitor, wherein
when the voltage detecting unit detects a decrease in the resonance output voltage, the control unit increases the first frequency.

12. A projector comprising:
a discharge lamp;
the discharge lamp lighting device according to claim 11 configured to light the discharge lamp; and
a projection optical system configured to project light that is irradiated from the discharge lamp and modified.

13. A projector comprising:
a discharge lamp;
the discharge lamp lighting device according to claim 10 configured to light the discharge lamp; and
a projection optical system configured to project light that is irradiated from the discharge lamp and modified.

14. The discharge lamp lighting device according to claim 1, further comprising
a lighting detecting unit configured to detect a lighting state of the discharge lamp, wherein
when the lighting detecting unit determines that the discharge lamp is lit, the control unit continues the lighting start period until a predetermined time elapses from a lighting start of the discharge lamp.

15. A projector comprising:
a discharge lamp;
the discharge lamp lighting device according to claim 14 configured to light the discharge lamp; and
a projection optical system configured to project light that is irradiated from the discharge lamp and modified.

16. A projector comprising:
a discharge lamp;
the discharge lamp lighting device according to claim 1 configured to light the discharge lamp; and
a projection optical system configured to project light that is irradiated from the discharge lamp and modified.

17. A discharge lamp lighting method comprising:
converting direct-current power into alternating-current power and supplying the alternating-current power to a discharge lamp via a resonance circuit unit;
supplying the alternating-current power alternately having a first frequency and a second frequency different from the first frequency, to the discharge lamp in a lighting start period from a start of lighting of the discharge lamp to the time the discharge lamp is lit; and
changing stepwise the first frequency to decrease from a frequency higher than a frequency for causing resonance of the resonance circuit unit toward the frequency for causing the resonance, wherein
the second frequency is higher than the frequency for causing the resonance and equal to or higher than 100 kHz.

* * * * *